(12) United States Patent
Crezee

(10) Patent No.: US 11,530,061 B2
(45) Date of Patent: Dec. 20, 2022

(54) CONVEYOR FOR PRODUCTS SUCH AS EGGS

(71) Applicant: Moba Group B.V., Barneveld (NL)

(72) Inventor: Leonard Paulus Crezee, Oudewater (NL)

(73) Assignee: MOBA GROUP B.V., Barneveld (NL)

(*) Notice: Subject to any disclaimer, the term of this patent is extended or adjusted under 35 U.S.C. 154(b) by 0 days.

(21) Appl. No.: 17/278,849

(22) PCT Filed: Oct. 16, 2019

(86) PCT No.: PCT/NL2019/050682
§ 371 (c)(1),
(2) Date: Mar. 23, 2021

(87) PCT Pub. No.: WO2020/080940
PCT Pub. Date: Apr. 23, 2020

(65) Prior Publication Data
US 2021/0323701 A1 Oct. 21, 2021

(30) Foreign Application Priority Data
Oct. 16, 2018 (EP) ..................................... 18020502

(51) Int. Cl.
*B65B 23/08* (2006.01)
*B65B 35/16* (2006.01)
*B65G 47/38* (2006.01)

(52) U.S. Cl.
CPC .............. *B65B 23/08* (2013.01); *B65B 35/16* (2013.01); *B65G 47/38* (2013.01); *B65G 2201/0208* (2013.01)

(58) Field of Classification Search
CPC ......... B65B 23/08; B65B 35/16; B65B 35/58; B65G 47/38; B65G 2201/0208
See application file for complete search history.

(56) References Cited

U.S. PATENT DOCUMENTS

| 3,587,888 A | 6/1971 | Warren |
| 3,894,631 A * | 7/1975 | Rose ...................... B65G 47/74 |
| | | 198/418.6 |

(Continued)

FOREIGN PATENT DOCUMENTS

| EP | 2 842 877 | 3/2015 |
| JP | Sho64-45619/1989 | 3/1989 |

(Continued)

OTHER PUBLICATIONS

International Search Report for PCT/NL2019/050682 dated Apr. 3, 2020.

(Continued)

*Primary Examiner* — Andrew M Tecco
*Assistant Examiner* — Nicholas E Igbokwe
(74) *Attorney, Agent, or Firm* — Stephen J. Weyer; Stites & Harbison, PLLC

(57) ABSTRACT

The present invention provides an apparatus for transferring products, for example eggs, from an endless conveyor to carrier units, comprising—the conveyor with at least a single row of transport carriers, and—a transfer unit positioned near the conveyor, which further comprises an arm pivotable around a shaft and having at its end a transfer carrier, wherein the relative velocities upon takeover from the conveyor and upon transfer to such a carrier unit are virtually 0 m/s, and wherein the shaft is driven by a motor with independently controllable speed. Furthermore, the present invention provides a method for, from an endless conveyor having transport carriers for carrying along products, transferring therefrom the products, for example eggs, to carrier units.

18 Claims, 3 Drawing Sheets

(56) References Cited

U.S. PATENT DOCUMENTS

Figure 1:
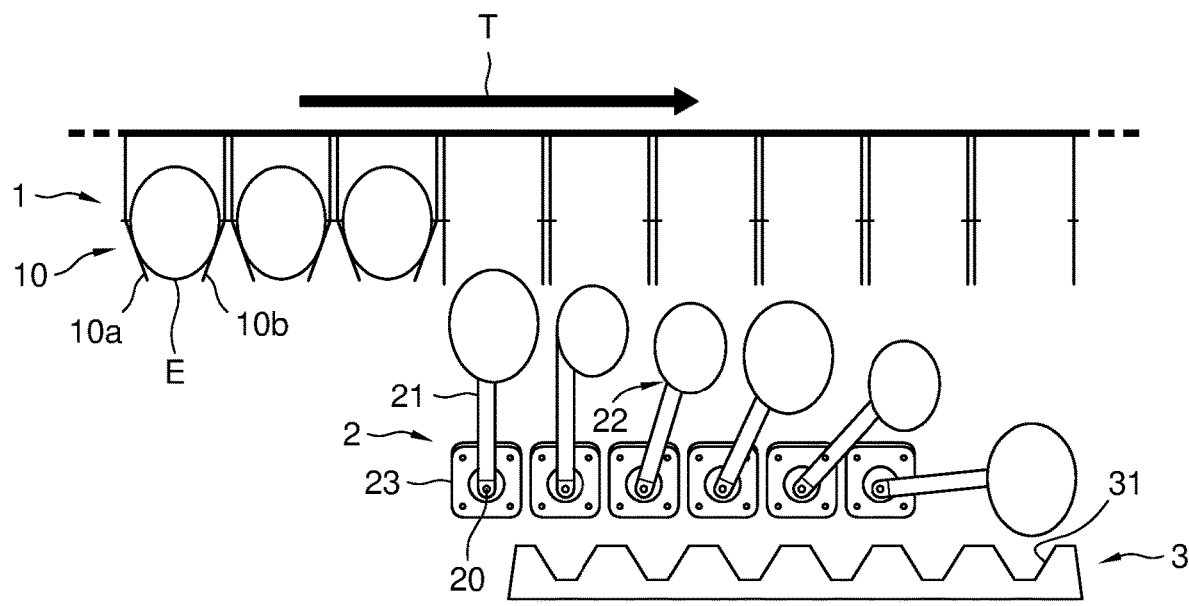

| | | | |
|---|---|---|---|
| 4,355,936 A * | 10/1982 | Thomas | B65G 47/91 |
| | | | 414/797 |
| 4,462,201 A | 7/1984 | Nambu | |
| 5,101,954 A * | 4/1992 | Nambu | B65B 23/06 |
| | | | 209/912 |
| 5,232,080 A * | 8/1993 | van Essen | B65B 65/02 |
| | | | 198/418.6 |
| 5,884,750 A | 3/1999 | van Veldhuisen | |
| 6,446,784 B1 | 9/2002 | Hout et al. | |
| 8,607,960 B1 * | 12/2013 | Bliss | B65G 17/005 |
| | | | 198/406 |
| 10,183,815 B2 | 1/2019 | Hordijk et al. | |
| 2017/0073096 A1 * | 3/2017 | Baumeister | A23G 7/0081 |
| 2018/0265307 A1 * | 9/2018 | Hordijk | B65B 23/06 |

FOREIGN PATENT DOCUMENTS

| | | | | |
|---|---|---|---|---|
| WO | WO-2016118004 A1 * | 7/2016 | | B65B 23/06 |
| WO | WO 2016/195418 | 12/2016 | | |

OTHER PUBLICATIONS

International Preliminary Report on Patentability for PCT/NL2019/050682 dated Jul. 13, 2020.
Office Action dated Jul. 25, 2022 in corresponding Japanese Patent Application No. 2021-515003.

* cited by examiner

CONVEYOR FOR PRODUCTS SUCH AS EGGS

The present invention relates to an apparatus for transferring products, for example eggs, from an endless conveyor to carrier units, comprising,
- the conveyor with at least a single row of transport carriers, and
- a transfer unit positioned near the conveyor, which further comprises an arm pivotable around a shaft and having a transfer carrier at the end thereof, wherein the relative velocities upon takeover from the conveyor and upon transfer to such a carrier unit are virtually 0 m/s.

Further, the present invention provides a method for, from an endless conveyor having transport carriers for carrying along products, transferring therefrom the products, for example eggs, to carrier units.

Such an apparatus is for instance known from EP845414, namely, a part of an egg sorting machine, more particularly a link in the supply portion thereof.

As is clearly described in this document, eggs are transferred from a first endless conveyor moving in a direction X by carriers on pivoting and upwardly moving swivel arms to a second endless conveyor moving in a direction Y. Each of these conveyors generally has multiple lines or rows of carriers.

In EP845414 the two conveyors comprise systems of grippers, whereby a first system of the first conveyor transfers the eggs from grippers onto carriers positioned on these swivel arms,
whereupon the swivel arms bring the carriers along a curved path with components in the X-Y-Z directions, upwards, and
whereupon finally a system of grippers of the second conveyor takes over the eggs from the carriers of the swivel arms.

For both transfer moments, the relative velocities are approximately 0 m/s.

Most clearly, the movement of the three systems, namely the first conveyor, the second conveyor, and the swivel arms, are coupled,
on the one hand by the curve disc and the dimensions incorporated therein, and
on the other hand by setting the drive such that it matches movements of the conveyors in the X direction and in the Y direction.

More particularly, swivel arms with cam followers in well-defined cam paths are used, such that upon a change of velocity in the X direction or in the Y direction proportionally the velocities are adjusted.

In such a functional system as part of a sorting machine, the velocities involved are related to the processing capacity of the machine. The values thereof are absolute values, so that the velocities have values measured with respect to the frame of the sorting machine. Consequently, none of the velocities intended here will have an absolute value of 0 m/s, that is, the velocity of the frame itself, unless the machine stands still.

To those skilled in the art it will therefore be clear that this prior art apparatus is not suitable for transfer of products between machine parts of which one has the above-mentioned absolute velocity 0 m/s.

In U.S. Pat. No. 5,101,954 also an egg sorting machine is described, in particular that part of the machine where the eggs are discharged from grippers of the main conveyor into carrier units, for example packaging units. In FIGS. 16b and 16c of this document it is shown how eggs are discharged in a well-defined manner from grippers into nests of packaging units, while the packaging units, as mentioned above, have a velocity of 0 m/s, in other words, stand still on a frame on which they are positioned.

As is clearly described, these grippers are coupled to a traveling conveyor, whereby, through associated pivoting movements of arms to ends of which the grippers are attached, the grippers are rotated to discharge positions above the nests mentioned in order to be opened at well-chosen moments and the eggs are discharged from a position just above a nest.

Also in the apparatus of U.S. Pat. No. 5,101,954, these arms with grippers are, in their movement, mechanically coupled to the conveyor with which they are moved to the discharge positions.

In the current art of sorting large quantities of products, for example food products, more particularly eggs, fruit, and vegetables such as tomatoes or peppers, the aim is for high processing capacities. In the case of eggs, for instance, this is about sorting machines that can pass up to as many as 250,000 eggs per hour, including supply followed by detection and characterization (weight, breakage), to a packaging unit. Of relevance here is not only the speed of the above-mentioned operations, and in particular that of the conveyor itself, but also, and especially so, the manner in which the eggs are discharged from such a conveyor and end up in the nests mentioned.

To those skilled in the art, it will be clear that given the high processing capacities mentioned, damage can occur especially upon takeover of the products by successive machine parts, and certainly so upon discharge, more particularly ejection and release of the products, directly at the nests. With eggs, this is about unacceptable fracture percentages; with many kinds of fruit and vegetables, this is about bruised spots or worse.

To provide for the above-mentioned deficiencies, the present invention provides an apparatus as described in the introduction, where the shaft of the pivotable arm is driven by a motor with independently controllable speed.

In the art of the sorting machines discussed here, the technical measure according to the present invention is a drastic technical change.

It has been found that this measure yields a series of advantages, namely,
- a less rough, and thus, in particular, considerably improved, takeover and delivery of the products, for example eggs, in the trajectory from the endless conveyor to the carrier unit, because with the control (i.e., independent control of the speed of the motor), the velocities for these situations can be very accurately set and also readjusted,
- due to this improved takeover and delivery, in the case of eggs, less fracture occurs, while in the case of fruit such as apples, fewer bruised spots occur;
- due to less breakage occurring in the case of eggs, there is correspondingly less occurrence of leaky eggs, resulting in a more hygienic treatment process, and
- a processing capacity of such a sorting system can be regulated better, which has been found to allow the capacity, often high as it is, to be augmented still further.

In particular, such an independent control (of the shaft motor, or more specifically of the respective motor speed) makes it possible, depending on the type of machine, and certainly also depending on the type of products being presented, for example eggs, to have this transfer proceed not only faster but also slower, and thus to transfer or pack also special types of products (for example a batch of weak-shell eggs) without possible damage.

Further, an aspect of the invention is characterized by the measures of claim 10.

Advantageously, there is provided a method for transferring products, for example eggs, from an endless conveyor to carrier units, the endless conveyor comprising transport carriers for carrying along the products. The method may for instance utilize an apparatus according to the invention. In particular, the method comprises:

supplying the eggs with the conveyor at a well-defined transport velocity vtr to a station for discharging the eggs, independently controlling a transfer unit which is comprised in the station, whereby transfer carriers of the transfer unit are brought near the transport carriers and for a well-defined time duration are moved along directly near the transport carriers at the transport velocity, discharging such a product from the near transport carrier and receiving the product in the near transfer carrier, supplying at least a single carrier unit for taking up at least a single product, in the controlled manner, transporting the transfer unit to a carrier unit, whereby the transfer unit is brought next to the carrier unit and for a well-defined time duration is moved directly near the carrier unit, and discharging the product from the transfer unit and receiving the product in the carrier unit.

Further, extra advantageous elaborations of the invention are set forth in the dependent claims.

Figure 6:
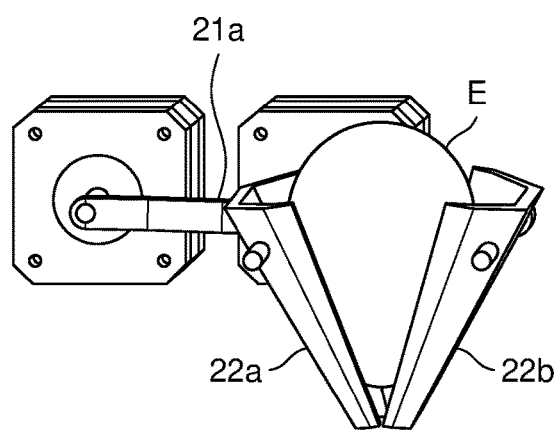
Figure 7:
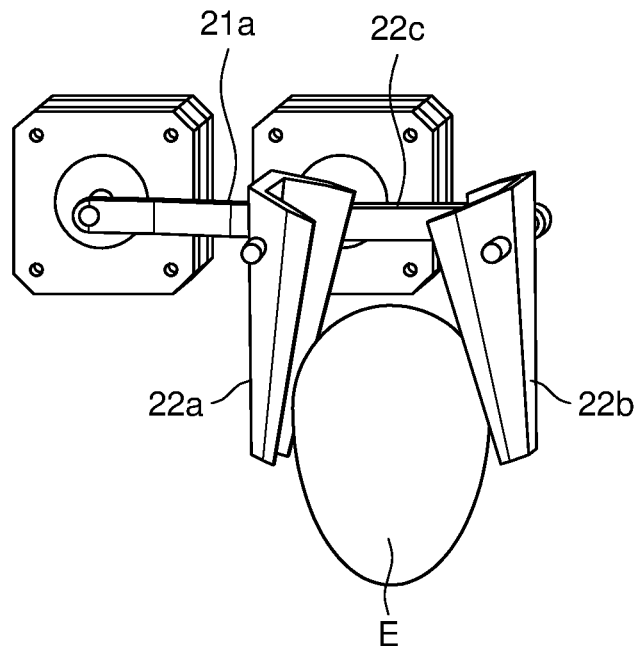
Figure 8:
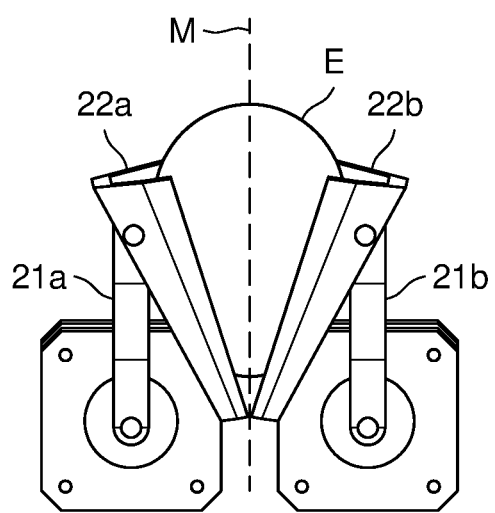

Further variants, exemplary embodiments, and associated possibilities and advantages of the present invention will hereinafter be elucidated in detail with reference to a drawing, in which, FIG. 1 is a schematic view of a part of a sorting machine where eggs are transferred, namely carried along, and discharged, with therein a first exemplary embodiment of a transfer unit, in different transfer positions, according to the present invention, FIG. 2 pictures in a schematic manner in a graph the movement and the trajectory of the transfer unit, FIGS. 3-7 show mainly in front view a second exemplary embodiment of the transfer unit of the present invention, at successive points in time, from the moment of discharge as the start of transfer and further during the transfer of a product to a carrier unit, and FIG. 8 schematically shows a further exemplary embodiment of the transfer unit according to the present invention.

In these FIGURES, for the same parts or designations, the same signs, symbols, or numerals will be used.

In FIG. 1 a schematic view is shown of a part of an endless conveyor 1 of a sorting machine where eggs E are transferred, namely discharged, with therein a first exemplary embodiment of a transfer unit 2 according to the present invention.

FIG. 1 shows an apparatus 1 (for example a sorting machine 1) for transferring products, for example eggs, from an endless conveyor 10 to carrier units. In the present exemplary embodiment, the endless conveyor comprises one or more lines or rows of grippers 10 (also referred to as transport carriers).

Further, the apparatus 1 includes a transfer unit 2 positioned near the conveyor 10. This unit 2 comprises an arm 21 pivotable around a shaft 20 and having at the end thereof a transfer carrier 22. Thus, the unit 2 is configured to have the transfer carrier 22 traverse a curve path, in particular a circular path (in particular a part of a circular path, namely from a starting point S to an end point D located at a lower level, see FIG. 2). The relative velocities upon takeover from the conveyor and upon transfer to such a carrier unit are virtually 0 m/s.

With great advantage, the shaft 20 of the transfer unit is driven by a motor 23 with independently controllable speed (so that a rotation speed of the shaft 20, i.e., shaft speed, is independently controllable). Thus, according to a further elaboration, the apparatus 1 may be so configured that the velocity during use, in particular during transfer of a product from the conveyor 10, is readjusted (see e.g. the trajectory in FIG. 2). In particular, the above-mentioned motor speed (or more specifically shaft speed) is not constant as a result of control or readjustment of that speed, during product transfer.

The sorting machine 1 is represented here, in particular, as a single line or row of grippers 10 with gripper halves 10 $a,b$, with movement in a transport direction T. During use, the conveyor can for instance impart a predetermined transport velocity (vtr) to the grippers. These grippers are connected in a known manner with endless chains known per se (not shown) driven by a motor, and, in a manner likewise known, can be opened and closed to clamp eggs E and thus transport them, and later discharge them at a suitable location.

To those skilled in the art it will be clear that also other types of grippers or holders can be used, for example, but not exclusively, small boxes that can be opened, or also suction cups.

The present invention further provides a transfer unit 2 as mentioned, which in turn comprises a motor 23 as mentioned, with a shaft 20 as mentioned, which is driven by the motor 23 and which is connected with a pivotable arm 21 as mentioned. This arm 21 carries at its end a transfer carrier 22 (not represented in this FIG. 1) for taking over the eggs E from the grippers 10, for bringing the eggs E over to, and transferring the eggs E to a carrier unit 3. In FIG. 1, this carrier unit 3 is a tray with nests 31. Control of the motor 23 may be carried out, for example, by a suitable motor control, for example a controller, computer, control electronics or the like which will be clear to one skilled in the art. Depending on the type of motor, the control may be configured, for example, to regulate electrical voltage or current to be supplied to the motor, for the purpose of regulating or changing a shaft speed as mentioned. Alternatively, the control may be configured to supply to the motor a control signal which comprises a shaft speed to be furnished by the motor, such that the motor 23 furnishes this shaft speed under the influence of reception of this control signal. The motor 23 may be configured to rotate the shaft in two mutually opposite rotation directions, for example a forward rotation direction and a return shaft direction (as in FIG. 2).

As motors 23, for example servo motors or stepping motors can be used, which will be clear to one skilled in the art.

Figure 2:
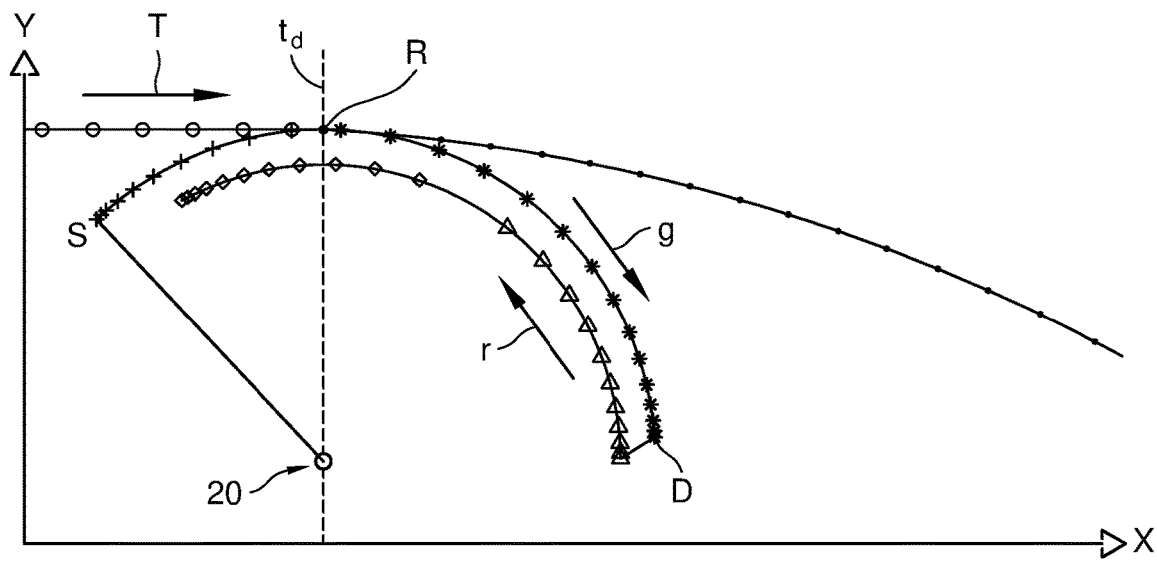

With reference to FIG. 2, below, the movements and functions of the various parts will be further elucidated.

In FIG. 2, movement and trajectory of the transfer unit are schematically pictured in a graph. Reflected in an X-Y diagram (with X, for example, a horizontal direction and Y a vertical direction) are curves of traversed paths or movements, given a well-defined velocity of the conveyor 1 moving in the transport direction T.

These curves match with symbols (dots, circles, etc.) which represent positions in this X-Y diagram. To those skilled in the art, it will be clear that these positions depend on the settings of the sorting machine and of the correspondingly chosen dimensions and settings of the transfer carrier 22.

The graph shown in this FIG. 2 is a calculation example based on experiments with such a transfer carrier.

Such a succession of symbols forms a sequential order in time, with equal time intervals between these symbols. More particularly indicated between these symbols are greater, equal, or smaller intermediate distances, which, given the equal time intervals just mentioned, accordingly reflect correspondingly greater, equal, or lower velocities.

The meaning of the symbols, signs, and letters used in this FIG. 2 is explained below.

$t_d$ the time (or respective position) associated with the vertical line as an indication of the position at which an egg E is discharged from a respective gripper;

o, • a horizontal path, and parabolic path following it—this parabolic path is followed if a product, such as an egg E here, is discharged from a gripper without further guidance; sometimes also formulated as 'the egg upon falling follows a parabolic path'; in other words: in this FIG. 2 the open symbols (o) form the trajectory that is actually followed by the products (until the moment of transfer), while the dots (•) that follow stand for the trajectory of the parabola if the products were not taken over by the transfer unit 2 (but would make a free fall and thereby would hardly be slowed down in the X direction, and actually be accelerated in the Y direction by gravity);

+ a first part of the circular path that is followed by the transfer unit 22 according to the exemplary embodiment, namely a path from a starting point S, with arm 21, where the intermediate distances in especially the X direction between these + symbols (the substantially 'horizontal' part of the associated curve) remain virtually equal and are approximately equal to those according to the parabolic path (and thus also up to discharge), most clearly an indication of the fact that the velocity (vtr) of the conveyor 1, and hence of the grippers 10 having therein the products E, is virtually equal to that of the transfer carrier 22 of the transfer unit 2, or in other words, there is a relative velocity with Δv=0 m/s (during transfer of a product from conveyor 1 to transfer unit 2, at or near a transfer location R);

the transfer carrier 22 starts in starting point S and approximately from R (receiving), the product/egg E is taken over by this transfer carrier 22;

* after the takeover of a product E from a gripper 10 (by transfer unit 2), the transfer unit 2 will pivot along the circular path (see arrow g—go) further towards the carrier unit 3 with nests 31, to end point D, while slowing down to release the product directly at a nest 31, so that there too (at the path end point D) the velocity difference with respect to the carrier unit 3 is virtually 0 m/s;

this release takes place at an end point D (discharging), the end point D in this example being at a vertical level that is lower than a vertical level of the path's starting point S;

Δ after delivery, the arm 21 with empty transfer carrier 22 returns along the same circular path back to the starting point S, while accelerating in the first half (see arrow r—return);

◊ second part of the way back as before, while decelerating prior to arrival at the starting point S. Thereupon, the transfer carrier 22 is available again to receive a product from the conveyor 1, via the above-described steps, path, accelerations and decelerations.

It can also be seen in FIG. 2 that prior to R, namely between S and R, the carrier 22 accelerates to gain the proper velocity for takeover (in particular a takeover velocity that is equal to or virtually equal to an earlier-mentioned transport velocity vtr of the conveyor 1).

For clarity of the drawings, the forward path +,* and the return path Δ, ◊ are drawn next to each other in FIG. 2; in practice, the paths can overlap, at least if the shaft 20 is held in a spatially fixed position.

In the drawing, the successive points/positions (of +, *, Δ and ◊, respectively) drawn in the circular path can, in particular, reflect mutually the same intermediate periods/measuring moments of the associated parts of the apparatus (in particular the transfer carrier 22). If the points/positions are close to each other, the velocity is low, and if the points/positions are further removed from each other, the velocity is higher (the distance between two neighboring points is therefore a measure of the local rotation speed).

From this, it follows that transfer carrier 22 can accelerate from a starting velocity (or angular velocity) zero to a defined transfer velocity, when the carrier pivots from the starting point S to the transfer point R.

Thereafter, upon the movement indicated with * from the transfer point R to the end point D, the carrier 22 will slow down to a velocity zero. Thereafter, the carrier can be moved in reverse direction (along the circular path) which entails an acceleration and deceleration again.

The accelerations and decelerations of the transfer carrier 22, in this example, are in particular effected by, at any rate under the influence of, the earlier-mentioned independent control of the motor 23, or shaft 20.

Figure 3:
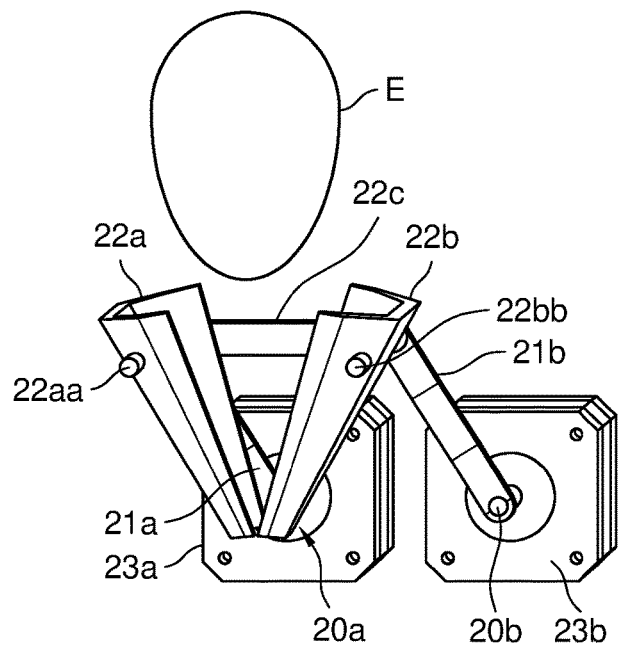

In FIG. 3 there is shown in isometric view a second exemplary embodiment of a transfer unit 2 of the present invention, at a time $t_d$, approximately at the moment of start of transfer, viz., in FIG. 2 the point R. In this second exemplary embodiment, the transfer unit 2 comprises two shafts 20a, 20b which are each independently controllable (by respective, independently controllable motors 23a, 23b).

As the drawing shows, the transfer unit 2 catches an egg E in two hand-shaped receiving halves 22a, 22b which are each connected with respective motors 23a, 23b via a respective shaft 20a, 20b through respective arms 21a, 21b. The two receiving halves 22a, 22b are connected through shafts 22aa, 22bb with the arms 21a, 21b and are connected mutually through a cross-bar 22c, itself freely pivoting on shaft ends 22aa, 22bb.

To those skilled in the art it will be clear that the movements and the positions of the receiving halves 22a, 22b are both partly defined by arms 21a, 21b and partly by the cross-bar 21c, while for the position of these halves 22a, 22b and the cross-bar 21c, for example gearwheels engaging into each other and then also functioning as locking mechanisms, or even separate motors for each of the shafts, may be used.

Figure 4:
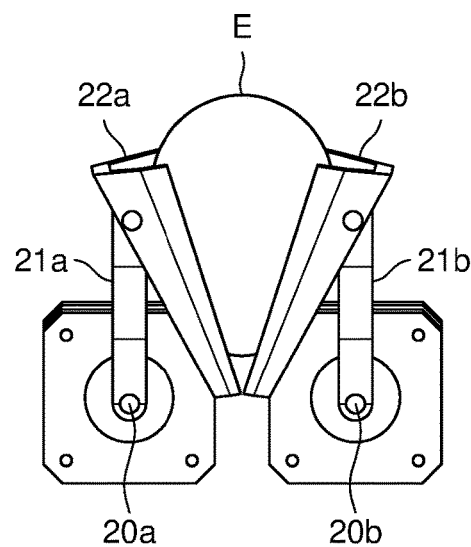
Figure 5:
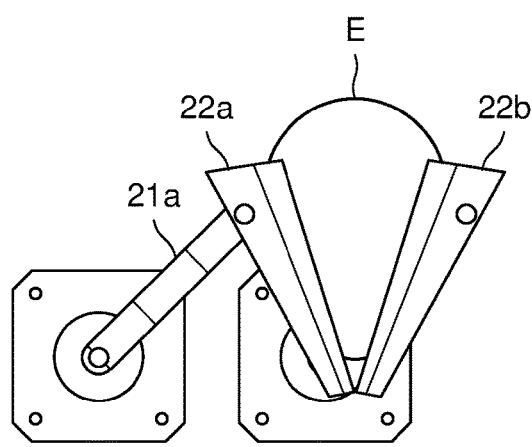

In the next FIGS. 4-7 there is represented in each case a next position in the trajectory of transfer, namely, in FIG. 4 the situation in which the egg E ends up in receiving parts 22a, 22b of the transfer unit 2 and is carried along therein during the further path while being confined and retained thereby, in FIG. 5 the situation in a next part of the earlier-mentioned circular path of the transfer unit 2, in FIG. 6 the situation in yet a further part of this circular path, and in FIG. 7 the situation where the transfer unit 2 is near the carrier unit 23 (and releases the product). The swiveling apart of the receiving halves 22a, 22b for the purpose of releasing the product E can be achieved in different manners, for example by the above-mentioned gearwheels engaging into each other and/or a separate drive, and/or by means of an external stop (not shown) or external driving means. Additionally, for example, spring means, not shown, may be provided to force the receiving halves 22a, 22b to a defined starting position (for example, to a closed position, shown in FIG. 3, for the purpose of receiving a product), which will be clear to one skilled in the art.

In FIG. 8 a same transfer unit 22 is represented (as shown in FIGS. 3-7), in this FIG. 8 with a broken line M through the center thereof. With this line, it is indicated that it may be at multiple angles, while the receiving halves by turning (in particular about the respective shaft 22aa, 22bb) can retain their angle to this line and thereby take up a skew position. A turning to such a position makes it possible to correct for a skew position upon receiving between these parts, or in the case of directed delivery to nests of the carrier unit.

It has been found that in this way off center positions of up to 45° can be used, or, stated differently, positions between −45° and 45°.

To those skilled in the art, it will be clear that for all above-mentioned holders, grippers, suction cups, etc., matching drives for closing and discharging can be used.

In the FIGURES associated with the exemplary embodiments mentioned here, when the product, here an egg E, is always discharged vertically, the transfer carrier 22 will always follow a path in a substantially vertical plane (see FIG. 2.) To those skilled in the art, it will be clear that in case of vertical takeover and delivery, also a transfer carrier that follows a trajectory in a horizontal plane may be used. Furthermore, it will be clear that trajectories in such planes can also follow curves other than those of a circle.

More particularly, the present invention offers the possibility of regulating the velocity of the transfer unit 22 in a wide range of velocities, for example from zero to a defined transfer velocity (for example equal to or near the transport velocity vtr) and back again to zero (then to be accelerated and decelerated in reverse direction).

In order that the products, as mentioned earlier, at takeover from the sorting machine 1 which carries along the grippers 10 in the transport direction T at a transport velocity vtr, be taken over as safely as possible, a velocity vtr will also be set for the transfer carrier 22 in that area.

To those skilled in the art, it will be clear that with the drives presently applied, depending on the situation, the velocity can be chosen in a wide range, and may even be greater than the conveyor velocity vtr mentioned.

In summary, by the transfer unit 22 a trajectory can be followed from a starting point S at the conveyor 1 up to the discharge at a discharge point R at the carrier unit 3, and back again for a next product, with a transfer unit velocity vtf which can be vmax at a maximum, where the velocity vtf of the transfer unit is controllable and is in a range with 0<vtr<vmax. This vmax is for instance determined and/or limited by the type of motor that is used, or also by properties of the egg (or other product E), such as the shell strength or the internal tensile force of the chalazae.

The invention is not limited to the exemplary embodiments described. Various modifications are possible within the scope of the invention as is set forth in the claims.

The invention claimed is:

1. An apparatus for transferring products, for example eggs, from an endless conveyor to carrier units, comprising:
   said conveyor with at least a single row of transport carriers, and
   a transfer unit positioned near the conveyor, which further comprises an arm pivotable around a shaft and having at the end thereof a transfer carrier,
   wherein relative velocities between the conveyor and the carrier units upon takeover from the conveyor and upon transfer to such carrier unit are virtually 0 m/s,
   wherein the shaft is driven by a motor with independently controllable speed, and
   wherein the transfer unit follows a trajectory in a substantially vertical plane.

2. The apparatus according to claim 1, wherein the transfer unit comprises a second pivotable arm, the pivotable arm and the second pivotable arm comprising at least two hand-shaped receiving parts, each connected with one of the pivotable arm and second pivotable arm, respectively.

3. The apparatus according to claim 2, wherein the shaft of a respective one of said two hand-shaped receiving parts are independently controllable by controllable motors.

4. The apparatus according to claim 3, wherein the hand-shaped receiving parts are substantially mirror symmetrical with respect to an imaginary plane, to be regarded as mirror symmetry plane.

5. The apparatus according to claim 4, wherein the movements performed by the receiving parts are symmetrical with respect to said mirror symmetry plane.

6. The apparatus according to claim 4, wherein the movements performed by the receiving parts are not symmetrical with respect to said mirror symmetry plane.

7. The apparatus according to claim 4, wherein said mirror symmetry plane is directed substantially vertically.

8. The apparatus according to claim 4, wherein said mirror symmetry plane upon transfer between the receiving parts to the carrier unit can take up intermediate positions in a range between 45° and −45° with respect to said vertical direction.

9. The apparatus of claim 1, wherein the transfer unit is configured to have the transfer carrier traverse a curved path.

10. The apparatus of claim 9, wherein the curved path is a circular path.

11. The apparatus of claim 9, wherein the curved path is a part of a circular path.

12. The apparatus of claim 9, wherein the curved path is a path from a starting point S to an end point D located at a lower level.

13. A method for transferring products, for example eggs, from an endless conveyor to carrier units, wherein the endless conveyor comprises transport carriers for carrying along the products, the method comprising:
   supplying the eggs with said conveyor at a well-defined transport velocity vtr to a station for discharging the eggs,
   independently controlling a transfer unit which is comprised in said station, whereby transfer carriers of the transfer unit are brought near the transport carriers and for a well-defined time duration are moved along directly near the transport carriers at said velocity,
   discharging such a product from the near transport carrier, and receiving said product in the near transfer carrier,
   supplying at least a single carrier unit for receiving at least a single product,
   in said controlled manner, transporting the transfer unit to a carrier unit, whereby the transfer unit is brought next to the carrier unit and for a well-defined time duration is moved directly near the carrier unit, and
   discharging the product from the transfer carrier and receiving said product in the carrier unit,
      wherein the transfer unit follows a trajectory in a substantially vertical plane.

14. The method according to claim 13, wherein by the transfer unit a trajectory is followed from a starting point S at the conveyor up to discharge at a discharge point R at the carrier unit, and back again for a next product, with a transfer unit velocity vtf which is vmax at a maximum, while the velocity vtf of the transfer unit is controllable and is in a range with 0<vtr<vmax.

15. The method according to claim 13, wherein the trajectory from the takeover from the conveyor to the discharge into the carrier unit comprises a part of a curve path, in particular a circular path.

16. The method according to claim 13, wherein the trajectory is in a substantially vertical plane.

17. The method according to claim 13, wherein for controlling the transfer unit, at least a single drive of a corresponding at least single motor is comprised.

18. The method of claim 13, wherein a trajectory from a takeover from the conveyor to the discharge into the carrier unit comprises a part of a circular path and wherein the curved path is a path from a starting point S to an end point D located at a lower level.

* * * * *